June 6, 1950     L. J. WILLETTE     2,510,196

FRYING PAN COVER

Filed Dec. 27, 1946

Inventor

LOUIS J. WILLETTE

Patented June 6, 1950

2,510,196

UNITED STATES PATENT OFFICE 2,510,196

FRYING PAN COVER

Louis J. Willette, Fairfield, Maine

Application December 27, 1946, Serial No. 718,769

1 Claim. (Cl. 126—384)

This invention relates to a new and improved frying pan lid and more particularly and specifically to a non-spattering lid.

The primary object of this invention resides in the provision of a removable lid for frying pans and the like which prevents the inherent spattering and spitting of grease therefrom and still permits the admission of needed air to said pan and the exhaust of the smoke thereof.

Another object of this invention is the provision of such a pan cover which is adapted to retain the fats and greases of cooking within the pan for a smooth browning and cooking of the food within the pan.

Still another object of this invention is the provision of such a lid which is durable and long lasting in use and which is of simple and inexpensive design and construction. Additionally this cover is quickly and easily cleaned and stored when not in use.

Still further improvements and advantages of this invention will readily appear to those skilled in the art when the following description is read in the light of the accompanying drawings in which.

Figure 1:
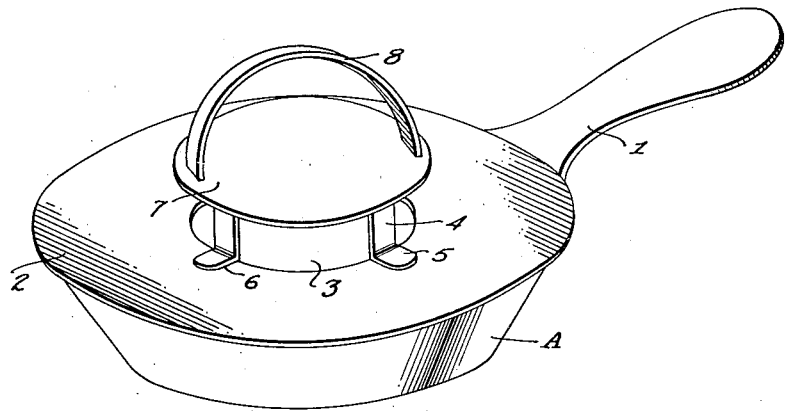
Fig. 1 is a perspective view of the lid positioned on a pan.
Figure 2:
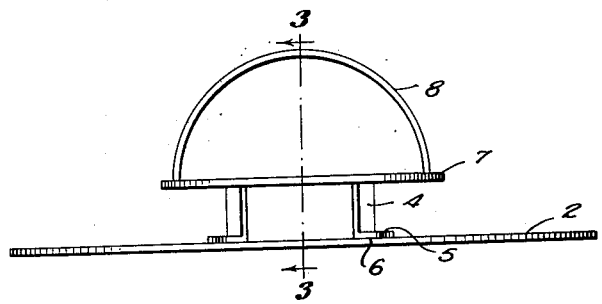
Fig. 2 is a front elevation of the cover.
Figure 3:
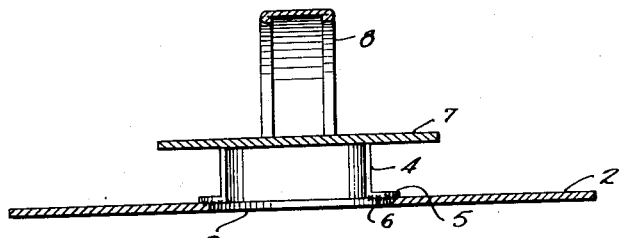
Fig. 3 is a vertical section of a side elevation of the covering lid taken on the line 3—3 of Figure 2.

Referring now to the accompanying drawings which illustrate the preferred embodiment of this invention and in which like numerals indicate similar parts throughout A designates a conventional frying pan comprising a raised edge open top pan with lifting handle 1 thereon.

The covering lid comprises a circular plate 2 of slightly greater diameter than the open end of said pan A with a circular hole 3 provided therethrough at the center thereof.

A plurality of L-shaped legs 4 are vertically secured about the hole 3 with the foot 5 of the leg 4 secured by a weld or the like, as at 6, to the lid cover in vertical positions therefrom.

A second circular plate 7 is horizontally secured to the upper end of said legs in an overlapping position relative to the circular hole 3 at the spaced distance thereabove on the upper ends of said legs.

A semi-circular curved bar 8 is secured in an inverted position to the upper side of the upper plate 7 forming a handle thereon for the lifting and transport of the lid.

It may be seen that when the lid is placed on and over the upper end of said pan to enclose the pan when a food is placed in the pan to be fried that the cooking grease in the pan will be prevented from splattering and spitting out from the pan with the allowed entrance of air into said pan and the escape of smoke from the pan through the hole 3.

It may also be seen that any grease escaping through said hole will collect on the under side of the plate 7 and fall back into the pan as will the grease collecting on the under side of the cover plate 2. This returning grease and fat will cause a more even cooking and browning of the food as well as increase the speed of the cooking thereof.

Thus having described and explained this invention and with full belief that modifications in size, materials, and general characteristics would not constitute departure from the spirit of this invention what I desire to claim in Letters Patent is:

A cover for an open-topped cooking utensil comprising a flat disc having one face adapted to be positioned in closing relation with respect to the open top of said cooking utensil, said disc being formed with a circular opening extending therethrough, a second flat disc having a diameter greater than that of the opening in said first-named disc arranged adjacent the other face of said first-named disc in superimposed spaced relation with respect to said opening, and a plurality of spaced L-shaped members each having one leg arranged in abutting relation with respect to said other face of said first-named disc and fixedly secured to the latter, and having the other leg arranged adjacent said second-named disc and fixedly secured to the under surface of the latter to thereby fixedly position said second-named disc in spaced relation with respect to said first-named disc.

LOUIS J. WILLETTE.

REFERENCES CITED

The following references are of record in the file of this patent:

UNITED STATES PATENTS

| Number | Name | Date |
| --- | --- | --- |
| 65,614 | Shaler | June 11, 1867 |
| 370,974 | Salfied | Oct. 4, 1887 |
| 840,762 | Gaenzle | Jan. 8, 1907 |
| 1,123,285 | Haverley | Jan. 5, 1915 |
| 2,428,894 | Serio | Oct. 14, 1947 |